United States Patent
Kalusche

(10) Patent No.: US 11,313,785 B2
(45) Date of Patent: Apr. 26, 2022

(54) SYSTEM AND METHOD FOR THE AUTOMATED ANALYSIS OF CELLULAR ASSAYS AND TISSUES

(75) Inventor: Geert Kalusche, Mannedorf (CH)

(73) Assignee: GLOBAL LIFE SCIENCES SOLUTIONS USA LLC, Wilmington, DE (US)

( * ) Notice: Subject to any disclaimer, the term of this patent is extended or adjusted under 35 U.S.C. 154(b) by 1466 days.

(21) Appl. No.: 12/595,623

(22) PCT Filed: May 7, 2008

(86) PCT No.: PCT/US2008/062847
§ 371 (c)(1),
(2), (4) Date: Oct. 13, 2009

(87) PCT Pub. No.: WO2008/137912
PCT Pub. Date: Nov. 13, 2008

(65) Prior Publication Data
US 2010/0128961 A1    May 27, 2010

Related U.S. Application Data

(60) Provisional application No. 60/916,425, filed on May 7, 2007.

(51) Int. Cl.
*G01N 15/14* (2006.01)
*G06K 9/32* (2006.01)
(Continued)

(52) U.S. Cl.
CPC ....... *G01N 15/1475* (2013.01); *G06K 9/0014* (2013.01); *G06K 9/3233* (2013.01);
(Continued)

(58) Field of Classification Search
USPC .......................................... 382/133
See application file for complete search history.

(56) References Cited

U.S. PATENT DOCUMENTS 5,556,764 A * 9/1996 Sizto ................. G06K 9/00127
435/7.24
6,573,039 B1 6/2003 Dunlay et al.
(Continued)

FOREIGN PATENT DOCUMENTS

CA    2848233 A1 * 11/2006  ............... G01N 1/31

OTHER PUBLICATIONS

Metz, John Langdon. "Optoelectronic Parallel Processing with Smart Pixel Arrays for Automated Screening of Cervical Smear Imagery." Order No. 9969392 University of Colorado at Boulder, 2000. Ann Arbor: ProQuest. Web. Dec. 10, 2021. (Year: 2000).*
(Continued)

*Primary Examiner* — Lena Najarian
(74) *Attorney, Agent, or Firm* — Hanley, Flight and Zimmerman, LLC

(57) ABSTRACT

A method for providing an image of a biological sample is disclosed. The method includes: obtaining an image of at least one biological sample; positioning the image of the at least one biological sample; assessing the image of the at least one biological sample; automatically segmenting the image of the at least one biological sample; while simultaneously determining a region of interest of the at least one biological sample; responsive to obtaining the image of the at least one biological sample and a control parameter of the at least one biological sample; and receiving the region of interest and providing an indication of a location of the region of interest.

16 Claims, 5 Drawing Sheets

(51) Int. Cl.
  *G06T 7/00* (2017.01)
  *G06K 9/00* (2022.01)
  *G06T 7/11* (2017.01)
(52) U.S. Cl.
  CPC .............. *G06T 7/0012* (2013.01); *G06T 7/11* (2017.01); *G06T 2207/10056* (2013.01); *G06T 2207/30024* (2013.01)

(56) References Cited

U.S. PATENT DOCUMENTS

| | | | | |
|---|---|---|---|---|
| 6,917,696 | B2* | 7/2005 | Soenksen | G02B 21/002 382/128 |
| 2001/0041347 | A1 | 11/2001 | Sammak et al. | |
| 2001/0050999 | A1* | 12/2001 | Bacus | G01N 15/1475 382/128 |
| 2003/0139886 | A1* | 7/2003 | Bodzin | G01N 21/47 702/28 |
| 2003/0231791 | A1 | 12/2003 | Torre-Bueno et al. | |
| 2004/0023320 | A1* | 2/2004 | Steiner | G01N 15/1475 435/40.5 |
| 2004/0093166 | A1* | 5/2004 | Kil | G01N 1/06 702/19 |
| 2005/0123181 | A1 | 6/2005 | Freund et al. | |
| 2006/0127880 | A1 | 6/2006 | Harris et al. | |
| 2007/0016373 | A1* | 1/2007 | Hunter et al. | 702/19 |
| 2008/0212867 | A1* | 9/2008 | Provenzano et al. | 382/133 |

OTHER PUBLICATIONS

Krewson et al., "Cell Aggregation and Neurite Growth in Gels of Extracellular Matrixmolecules," Biotechnology and Bioengineering, Wiley * sons, Hoboken, NJ, US vol. 43, No. 7, Mar. 25, 1994, pp. 555-562, XP002059314, ISSN: 0006-3592, DOI: 10.1002/BIT.260430704.

Teng et al,. "Cultured PC12 Cells: A Model for Neuronal Function, Differentiation, and Survival" in "Cell Biology, Four-Volume Set: A Laboratory Handbook," Nov. 30, 2005, Academic Press, XP055199790, pp. 171-176.

* cited by examiner

SYSTEM AND METHOD FOR THE AUTOMATED ANALYSIS OF CELLULAR ASSAYS AND TISSUES

CROSS-REFERENCE TO RELATED APPLICATIONS

This application is a filing under 35 U.S.C. § 371 and claims priority to international patent application number PCT/US2008/062847 filed May 7, 2008, published on Nov. 13, 2008, as WO 2008/137912, which claims priority to U.S. provisional patent application No. 60/916,425 filed May 7, 2007; the disclosure of which is incorporated herein by reference in its entirety.

FIELD OF THE INVENTION

The present invention relates to a system and method for the automated analysis of cellular assays and tissues.

BACKGROUND OF THE INVENTION

Generally, the way most genes, cells and viruses functions in humans and other organisms is relatively unknown despite the fact that here have been successful genomic sequencing programs and other types of programs. Thus, there is a need for high-throughput screening or cellular assays that enables one to learn and understand gene functions. High-throughput screening makes it possible to review and analyze hundreds of thousands of gene products. The results of these analyses enables one to review the biological processes that takes place within the cell, which is necessary for the analysis of the cells because it is important to scientific investigation of biological assays.

Typically, image analysis modules for cellular assays, cell clumps or tissues occur by utilizing automated imaging analysis systems that are dependent on homogenous, controlled populations or prior knowledge where in the sample container of the object of interest is located. That means for example that the object density in the field of view (FOV) is homogeneous and representative for the application of interest. In case of sparse objects of interests like e.g. cell clumps the user must manually find these clumps of the cells.

Therefore, there is a need for an automated system and method that provides the user with a simple method to find objects of interest, such as sparse cell clumps that grow in an explant culture, and only image those regions of the whole sample area that contain relevant objects. This reduces the amount of unnecessary image acquisition and image analysis and makes complex image post-processing routines like stitching obsolete.

SUMMARY OF THE INVENTION

The present invention has been accomplished in view of the above-mentioned technical background, and it is an object of the present invention to provide a system and method that provides an automated analysis of cellular assays and tissues.

In a preferred embodiment of the invention, a method for providing an image of a biological sample is disclosed. The method includes: obtaining an image of at least one biological sample; positioning the image of the at least one biological sample; assessing the image of the at least one biological sample; automatically segmenting the image of the at least one biological sample while simultaneously determining a region of interest of the at least one biological sample, responsive to obtaining the image of the at least one biological sample and a control parameter of the at least one biological sample; and receiving the region of interest and providing an indication of a location of the region of interest.

In another preferred embodiment of the invention, a system for providing an image of a biological sample is disclosed. The system includes a microscope system and an image receiving device. The microscope system is configured to: obtain an image of at least one biological sample; position the image of the at least one biological sample; assess the image of the at least one biological sample. The microscope system is coupled to the image receiving device, where the image receiving device is configured to receive the image of the at least one biological sample. The image receiving device is configured to: automatically segment the image of the at least one biological sample while simultaneously determining a region of interest of the at least one biological sample, responsive to obtaining the image of the at least one biological sample and a control parameter of the at least one biological sample; and receive the region of interest and provide an indication of a location of the region of interest.

BRIEF DESCRIPTION OF DRAWINGS

These and other advantages of the present invention will become more apparent as the following description is read in conjunction with the accompanying drawings, wherein.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
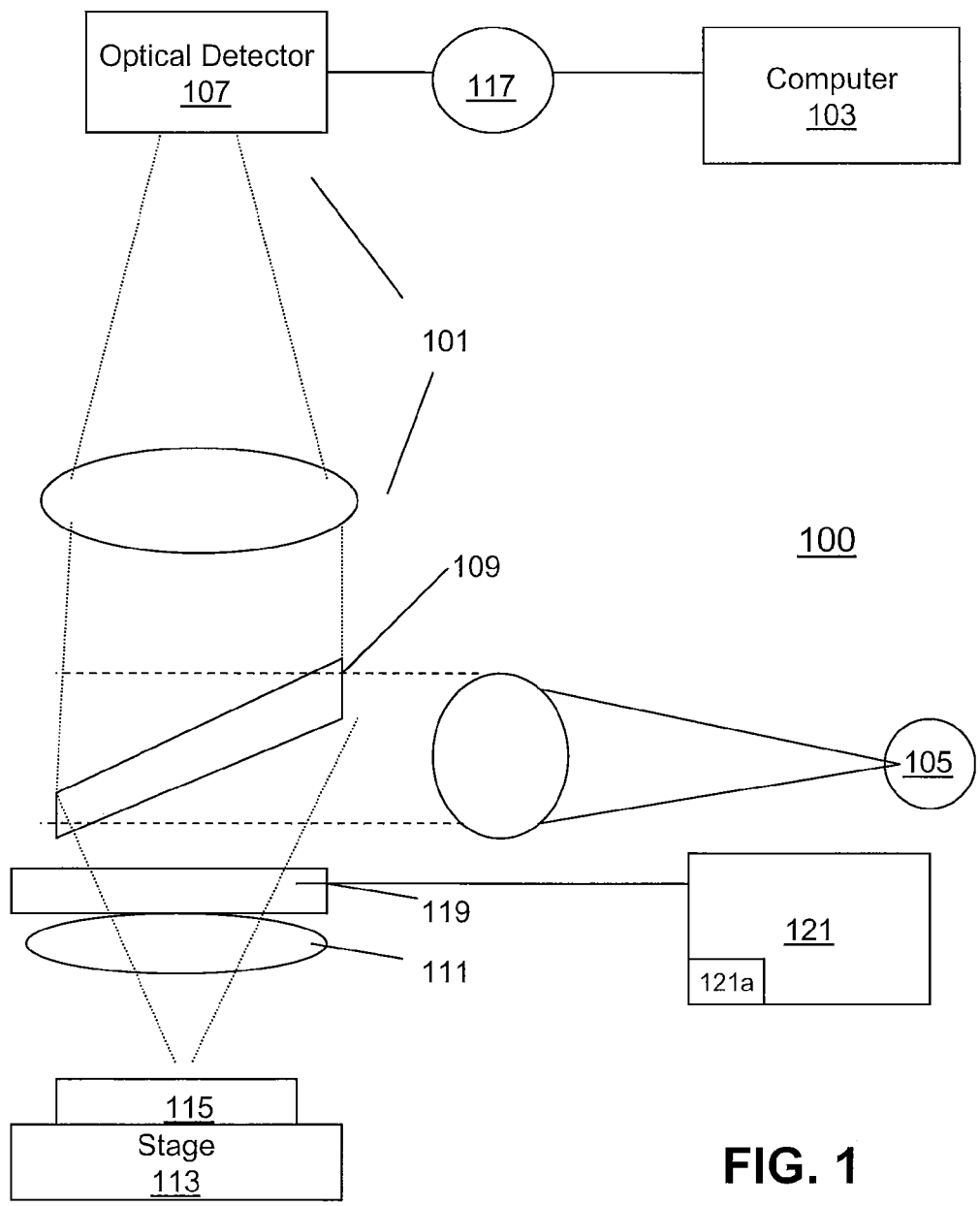
FIG. 1 illustrates a block diagram of a cellular assay system employed in accordance with an embodiment of the invention.

FIG. 1 illustrates a block diagram of a cell identification system of the invention. This cell identification system 100 or cellular assay system includes a conventional microscope system 101 electrically or wirelessly connected by a communication link 117 to a conventional computer 103. Microscope system 101 may also be a macroscope, a high throughput screening system or a multiple modality imaging system. Also, the microscope system 101 may also be the IN CELL™ Analyzer 1000 or 3000 manufactured by GE Healthcare in Piscataway, N.J. The communication link 117 may be a local access network (LAN), a wireless local network, a wide area network (WAN), a metropolitan area network, a virtual area network, a universal service bus (USB), an Ethernet link, a satellite link, cable, cellular, twisted-pair, fiber-optic or any network that is able to facilitate the transfer of data between the fluorescent microscope system 101 and the computer 103. Microscope system 101 includes a light source 105, an optical detector 107, a scanning mirror 109, an objective turret 119 that holds an objective lenses 111, an object stage 113 and a sample 115. In order to adjust the objective lenses 111, a control unit 121 is connected by a wire to the objective turret 102 that moves the objective lenses 111. Control unit 121 includes an actuator 121a that moves the objective turret 102 to move one of the objective lenses 111. The actuator may be a typical linear or rotary actuator. The rotary actuator 121 a may be a typical stepper motor, direct current motor or servo motor. Microscope system 100 may be referred to as an image transmitting device that is capable of capturing an image, by utilizing the optical detector 107, of the sample 115 or any type of object that is placed on the object stage 113. The sample 115 may be live biological organisms, biological samples, biological cells, bacteria, chemical and or biochemical reagents, synthetic and/or natural materials, on a slide, in wells of a micro-titer plate, or any other convenient sample holder. The fluorescent microscope system 101 may be a typical fluorescent microscope, phase contrast microscope, differential interference contrast microscope, or any microscope known to those of ordinary skill in the art. In another embodiment, the microscope system 101 may be a typical high throughput assay that is able to rapidly detect, analyze and provide images of biological organisms or the like.

The light source 105 may be a laser, a plurality of lasers, fiber optic light sources coupled to lasers, a light emitting diode, a lamp or any type of lighting source known to those of ordinary skill. This light source 105 may be a continuous source of light. Light source 105 provides excitation light to force the fluorescent dyes in the sample 115 to emit light from the stained portions of the sample 115. Typically, before the sample 115 is placed on the object stage 113 fluorescent dye molecules are inserted into the sample 115 or the sample is stained, whereby when the excitation light of the light source 105 contacts the sample 115 then the fluorescent dyes in the sample 115 absorb the light or radiation of the frequency of the light and emit an illumination light or radiation at a lower fixed frequency.

Scanning mirror 109 is located above the sample 115, this scanning mirror 109 operates as a typical scanning mirror or strip mirror that is able to receive the light or excitation light from the light source 105, then transfer the light through the objective lenses 111 to cause the fluorescent dye in the sample 115 to emit fluorescent light or illumination light that is transmitted back through the objective lenses 111 and the scanning mirror 109 to the optical detector 107. Scanning mirror 109 may also be referred to as a dichroic mirror 109, which reflects light shorter than a certain wavelength and passes light longer than that wavelength. The optical detector 107 that receives the illumination light may be a photomultiplier tube, a charged coupled device (CCD), a complementary metal-oxide semiconductor (CMOS) image detector, a solid-state photomultiplier array (SSPM), a diode array, an array detector, a photodiode, a photomultiplier tube (PMT) or any optical detector utilized by those of ordinary skill in the art. Optical detector 107, as stated above, is electrically or wirelessly connected by the communication link 117 to the computer 103.

The computer 103 may be referred to as an image receiving device 103, image detection device 103 or a high throughput screening device. In another embodiment of the invention, image receiving device 103 may be located inside of the image transmitting device 101. The image receiving device 103 acts as a typical computer, which is capable of receiving an image of the sample 115 from the optical detector 107, then the image receiving device 103 is able to build up or reconstruct the image by utilizing a standard image processing software program, algorithm or equation usually one pixel at a time. Also, the computer 103 may be a personal digital assistant (PDA), laptop computer, notebook computer, mobile telephone, hard-drive based device or any device that can receive, send and store information through the communication link 117. Although, one computer is utilized in this invention a plurality of computers may be utilized in place of computer 103.

Figure 2:
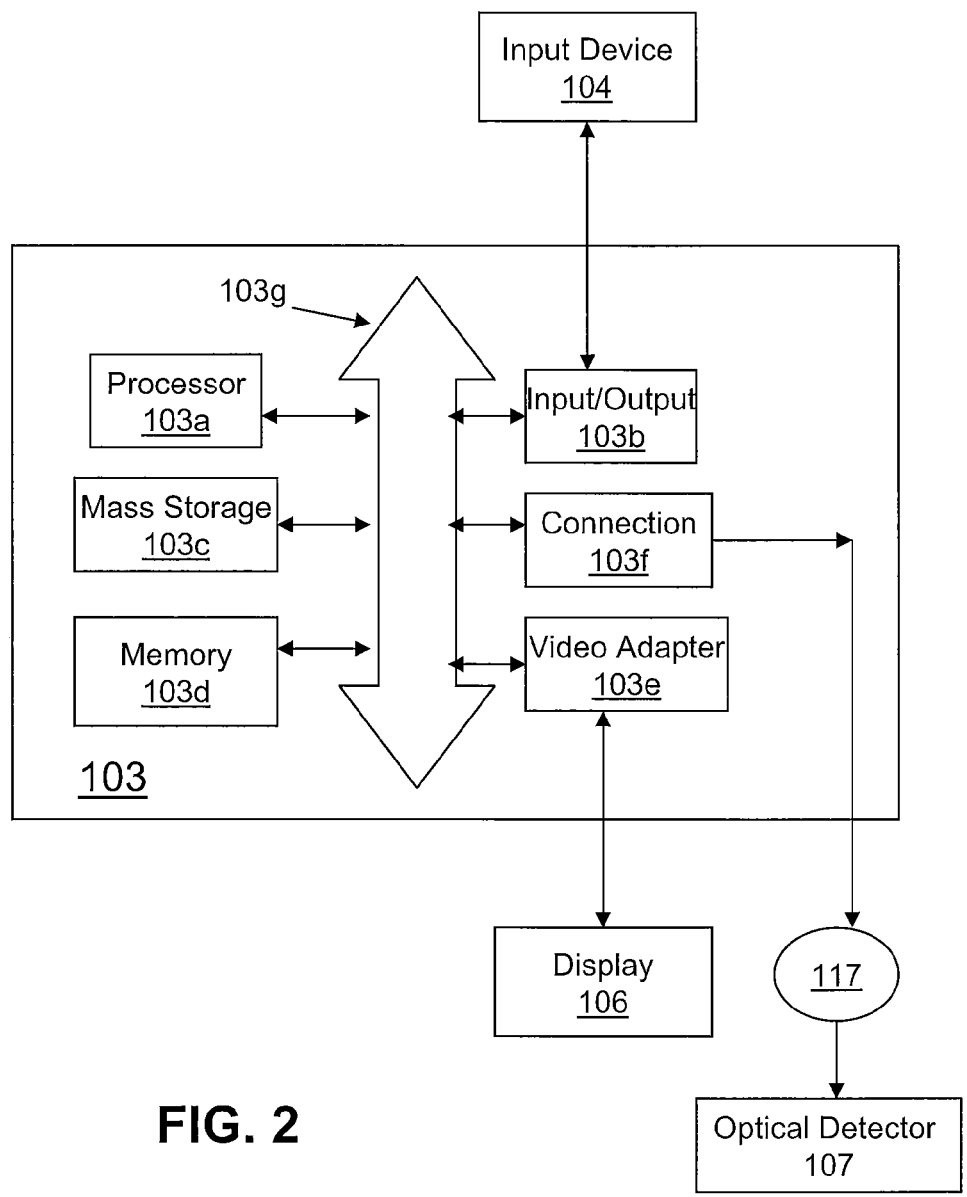
FIG. 2 is a schematic diagram of an image receiving device of the cellular assay system of FIG. 1 in accordance with the invention.

FIG. 2 illustrates a schematic diagram of the image receiving device of the segmentation system of FIG. 1. Image receiving device 103 includes the typical components associated with a conventional computer. The image receiving device 103 includes: a processor 103a, an input/output (I/O) controller 103b, a mass storage 103c, a memory 103d, a video adapter 103e, a connection interface 103f and a system bus 103g that operatively, electrically or wirelessly, couples the aforementioned systems components to the processor 103a. Also, the system bus 103g, electrically or wirelessly, operatively couples typical computer system components to the processor 103a. The processor 103a may be referred to as a processing unit, a central processing unit (CPU), a plurality of processing units or a parallel processing unit. System bus 103g may be a typical bus associated with a conventional computer. Memory 103d includes a read only memory (ROM) and a random access memory (RAM). ROM includes a typical input/output system including basic routines, which assists in transferring information between components of the computer during start-up.

Above the memory 103d is the mass storage 103c, which includes: 1. a hard disk drive component (not shown) for reading from and writing to a hard disk and a hard disk drive interface (not shown), 2. a magnetic disk drive (not shown) and a hard disk drive interface (not shown) and 3. an optical disk drive (not shown) for reading from or writing to a removable optical disk such as a CD-ROM or other optical media and an optical disk drive interface (not shown). The aforementioned drives and their associated computer readable media provide non-volatile storage of computer-readable instructions, data structures, program modules and other data for the computer 103. Also, the aforementioned drives include the system for an automated analysis of cellular assays and tissues algorithm, software or equation of this invention, which will be described in the flow chart of FIG. 3 that works with the memory 103d to find clumps in biological materials. In another embodiment of the invention, the system for an automated analysis of cellular assays and tissues algorithm, software or equation may be stored in the memory 103d, processor 103a or any other part of the image receiving device 103 known to those of ordinary skill in the art.

Input/output controller 103b is connected to the processor 103a by the bus 103g, where the input/output controller 103b acts as a serial port interface that allows a user to enter commands and information into the computer through input device 104, such as a keyboard and pointing devices. The typical pointing devices utilized are joysticks, mouse, game pads or the like. A display 106, is electrically or wirelessly connected to the system bus 103g by the video adapter 103e. Display 106 may be the typical computer monitor, Liquid Crystal Display, High-Definition TV (HDTV), projection screen or a device capable of having characters and/or still images generated by a computer 103. Next to the video adapter 103e of the computer 103, is the connection interface 103f. The connection interface 103f may be referred to as a network interface which is connected, as described above, by the communication link 117 to the optical detector 107. Also, the image receiving device 103 may include a network adapter or a modem, which enables the image receiving device 103 to be coupled to other computers.

Figure 3:
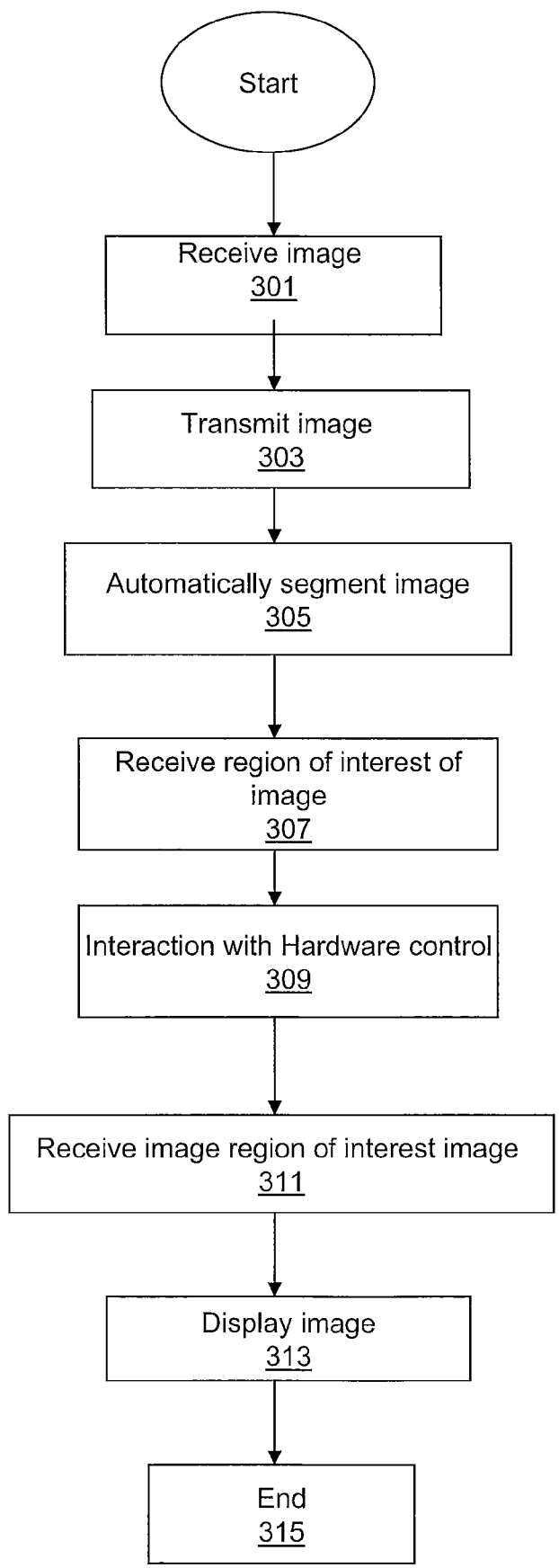
FIG. 3 is a flow-chart that depicts how the cellular assay system of FIG. 1 is utilized in accordance with an embodiment of the invention.
Figure 4:
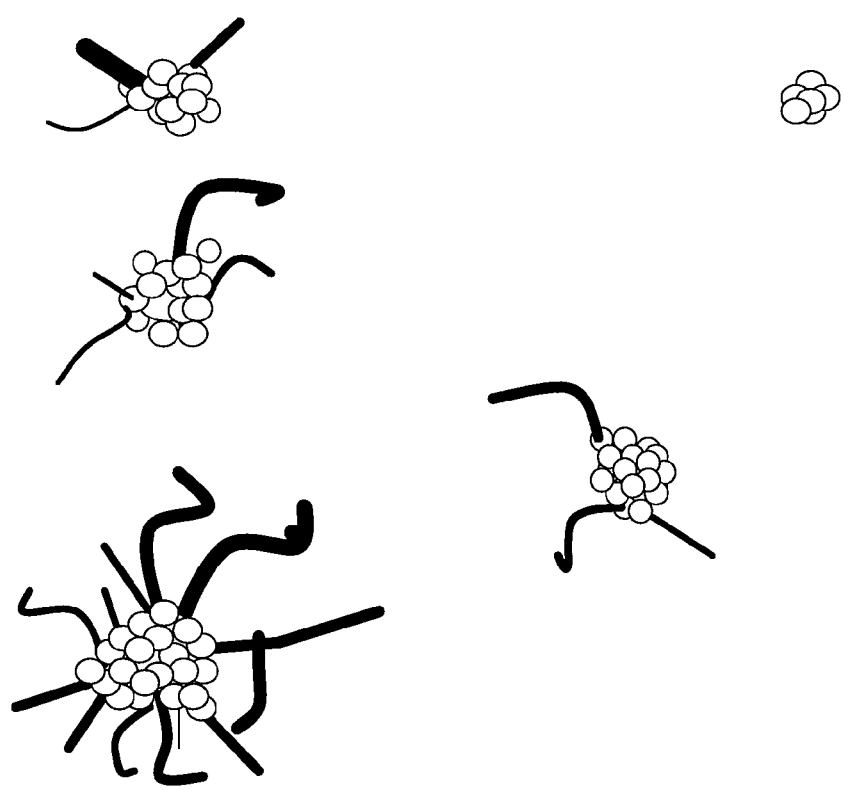
FIG. 4 illustrates an example of a possible biomedical sample with some cell clumps that grow in an explant culture in accordance with an embodiment of the invention.

FIG. 3 depicts a flow chart of how the automated cellular analysis is employed in accordance with the invention. A user may obtain a cell or biological material, such as the sample 115 (FIG. 1) described above, and place it on a typical microarray slide, typical well plate or typical microtitre plate and insert it onto the stage 113 of the microscope system 101. Microscope system 101 typically converts the sample 115 into a typical image. This image 401 is shown in FIG. 4; this image may be a zebra fish or some other typical biological image. FIG. 4. illustrates a schematic drawing of cell clumps that grow in an explant culture. These round cell clumps, which are not filled structures represent the cells and the fibrous black structures represent outgrowth structures from the cell clump during growth. The cell clumps of an explant culture are referred to as explants clumps. In this schematic drawing, there are 5 explants clumps in one preparation container. Usually, a person is forced to image these clumps in a manual or semi-automated way by using an automated assay, such as IN CELL.TM. Analyzer 1000 or 3000. This means the user needs to position the sample 115 in a field of view (FOV) of the microscope system 101 objective lens 111 or acquire a batch of images that overlay the sample 115 or the object of interest in the sample 115 and later reassemble the images to a superimposed one that contains the object in its entire size. One is able to utilize the microscope system 101, which is typically able to acquire an overview of the image, segment the image and provide some intensity weighting so the microscope system 101 can find a region of interest itself and can suggest a size-optimized image based on a calibration scheme of the microscope system 101. A size-optimized image should typically be taken with a higher magnification and/or a different optical modality. The system should in all cases make a suggestion for the optimal FOVs and optimal magnification which the user can accept or reject.

Referring to FIG. 3, at block 301, the image is analyzed or assessed by the microscope system 101. Typically, the assessment is done by the user utilizing the microscope system 101 to take an overview image of the sample 115 taken with a low resolution magnification component of the microscope system 101. The user utilizes a hardware control unit program, typically a part of the instrumentation software that resides in the memory 103d of the image receiving device 103 (FIG. 2), of the microscope system 101 to choose a low resolution objective from objective lenses 111 and put it in place for an initial scanning for regions of interest of the sample 115. The memory 103d of the image receiving device 103 may be wirelessly or connected by wire to the control unit 121. The user could, for example, use a default setting of the instrumentation software that always starts to image with the lowest magnification objective lens 111 available on the microscope system 101, such as 10×, 20× or 50× depending on the microscope system. The user may also choose one of the objective lenses 111 interactively from a list of magnification objectives lenses 111 on a graphical user interface on display 106 using prior knowledge at what objective magnification a good overview image can be taken for the biological sample that is investigated. Based on this initial setting the hardware control unit program in memory 103d, then controls the motor 121a, discussed above, that drives the objective turret 119 of the microscope system 101 then moves one of the chosen microscope objective lenses 111 into the optical path. Also, the user may have prior knowledge of assay preparation where the cell clumps/entities of sample 115 only are grown or grow in specific locations of the typical micro-titre plate (e.g. in a structure well plate) could also be used to determine later the regions of interests of the sample 115. The general aim is to find sparse objects in the well without taking images at a high resolution that does not contain any objects at all, but to move with components of the instrument and zoom into regions with high magnification where the sparse object is located.

At block 303, typically the microscope system 101 utilizing the optical detector 107 and the other typical components of the microscope system would take an image of the sample 115 and transmit it to the image receiving device 103 or computer 103. Next, at block 305 the image receiving device 103 receives the image of the sample 115. The image receiving device 103 includes a specialized segmentation software located in the memory 103d. Also, the specialized segmentation software may be used in a typical memory cache associated with the image receiving device 103, which is close to the processor 103a. This segmentation software is able to automatically segment the image and determine or suggest a region of interest of the sample 115, which is based on an assessment of the sample 115 and a control parameter. This specialized segmentation software finds image analysis parameters in the image 401 by utilizing a specific segmentation technique in an automatic way by scanning through the sample 115 and reporting a control parameter, for example the number of cell clumps. The control parameter may also be an entity of parameters to make the quality control more robust, where they relate to an intensity level, shape constraints. The microscope systems 101 are typically used for biological assay screening and/or biological sample investigation. The assay follows a biological assay preparation with a certain purpose in mind. The control parameter is a number that relates the biological preparation to the measured quantities using an automated image analysis and feature extraction routine. For example, if a certain seeding density for a cell based assay is used the automated routine should report a corresponding cell count or cell density. For the example of the explants clumps the number of prepared explants clumps should also be measured by the first image analysis step and an equal number of found explants should be reported. These control parameters can also be used in a more general fashion if the users are interested in subpopulation of their assay and want to investigate in details certain objects of their sample in more detail or with a different imaging modality in the described automated manner. The control parameter can be an application specific default or a user-defined configurable parameter. If the user wants to find explants clumps in certain wells an object count could be one default option. In another embodiment of the invention, the specialized segmentation software may interactively ask the user/assay developer by utilizing a graphical user interface what are the control parameters. The user has then the option to refine the object choice and take into account morphological and intensity descriptors or logical combinations of these descriptors. Once such a parameter is found in a set up mode or by using prior knowledge how the investigated objects look it can be stored and retrieved using a designated protocol structure on the mass storage device 103c. When the software program runs in the automated fashion it is loaded as machine code into the memory 103d of the system 103. The machine code used in the memory can retrieve the control parameters from the mass storage. The software component should however provide enough flexibility to cope with variation and equipment for different cellular applications. (The method assumes certain robustness with respect to the biological assay which is not unreasonable.) The used segmentation technique could be a simple threshold or any other methods that is used in the current software for the IN CELL™ Analyzer 1000 or 3000 assays.

The image analysis parameter set is accepted if it gets results closest to the control parameter or set of control parameters. In another embodiment of the invention, if such a control parameter is not available the software in processor 103a can suggest a segmentation of the overview image and ask the user to accept or reject it. In yet another embodiment of the invention, in the case of rejection, the user should have the ability to manually adjust the software on the image receiving device 103 and the image analysis parameters in order to achieve a reasonable segmentation of the overview image 401.

Figure 5:
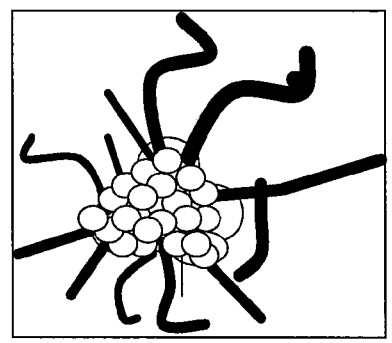
FIG. 5 illustrates a magnified version of one typical cell clump that grows in an explant culture in accordance with an embodiment of the invention.

Next, at block 307 the region of interest of the cell is received at the image receiving device 103. The region of interest is typically set by a bounding box that frames the object of interest in an automated way. Alternatively, the region of interest can be set by other methods like by a user-defined dilating box starting from the geometrical centre of the cell entity/clump or its center of mass of intensity, once the cell entity is segmented. The segmentation technique could be a simple threshold or any other methods that is used in the IN CELL™ Analysis software. A bounding box can be drawn around that center point of the cell entity that contains all segmented object detail (e.g. explants clumps) but taking the outermost left, right, top, bottom coordinates of the cell entity into account as shown in FIG. 5. FIG. 5 illustrates an expanded view of object details associated with the image of the cell. Referring to FIG. 3, the coordinates associated with FIG. 5 may be optionally extended by user interaction. These coordinates can be sent to instrument control of the software in the memory 103d to choose a maximum overlap with available microscope objectives 111 in the microscope system 101. At block 309, a software component in the memory 103d should tell the hardware control unit program of the microscope system 101 to choose one of the objective lenses 111 that gives the highest possible resolution when still imaging the whole object of interest. As stated above, the instrumentation software of memory 103d then drives the control unit 121 with the motor 121a that turns the objective turret 119 to turn the objective lenses 111. The objective turret 121 holds typically objectives lenses 111. During, the system set up (FIG. 1) the microscope objectives lenses 111 need to be installed in a predefined order allowing the instrumentation software to choose the correct objective and put it into the optical path. Other options, such as an instruction in the processor 103a to always go to the highest resolution objective may also be available. This highest resolution objective can again be identified using the predefined microscope objective installation information. Alternatively, it is possible to switch to different imaging modalities at this step if they are available on the instrument and a software component is available to drive it.

At block 311, when one of the preferred objective lenses 111 is brought into the optical path by a hardware component that drives the objective turret 119, then the image acquisition/segmentation can start in the same way that is done now. At block 313, the image of the cell is displayed on the display 106, then the process ends at block 315.

This invention provides an automated cellular assays system that allows a user to quickly find explants clumps in a biological cell. The user is able to immediately identify if the biological object is a clump by taking a thorough initial assessment of the object. A microscope system in an automated cellular assay system includes segmentation software that utilizes a control parameter to accurately identify explants clumps. The user will not have to manually identify explants clumps in cells because the microscope system will be able to quickly and accurately perform this function for the user. Thus, this invention provides the user with a simpler method to identify explants clumps in biological samples.

Although the present invention has been described above in terms of specific embodiments, many modification and variations of this invention can be made as will be obvious to those skilled in the art, without departing from its spirit and scope as set forth in the following claims.

What is claimed is:

1. A computer-implemented method for imaging a sparse object of interest in a biological sample resulting from a biological assay preparation, the method comprising:
obtaining an overview image of the biological sample by controlling a microscope system to acquire an image at a first magnification;
segmenting the overview image based on at least one image analysis parameter identified by a computer in the overview image, the at least one image analysis parameter used by the computer to define a segmentation of the overview image based on features in the overview image;
determining a region of interest for the sparse object of interest based on the segmenting and a comparing of at least one control parameter to the at least one image analysis parameter, wherein the at least one control parameter comprises a number that relates the biological assay preparation to measured quantities of the sparse object of interest using image analysis and feature extraction to determine the region of interest, values of the at least one control parameter determined by scanning the biological sample in segmenting the overview image, and the at least one image analysis parameter accepted based on the comparison to the at least one control parameter;
generating, based on the region of interest and the at least one control parameter, a magnification suggestion for obtaining a magnified image of the sparse object of interest; and
driving selection and position of a lens of the microscope system according to the region of interest and the magnification suggestion, aligning a field of view of the microscope system with the region of interest and the magnification suggestion to obtain the magnified image of the sparse object of interest by controlling the microscope system, the microscope system acquiring images of the region of interest according to the field of view at a second magnification higher than the first magnification.

2. The method according to claim 1 wherein the region of interest comprises a bounding box for the sparse object of interest, and wherein driving the selection and position of the lens to obtain the magnified image comprises choosing the second magnification, from a set of available magnifications, that gives the highest possible resolution when still imaging a whole sparse object of interest as defined by the bounding box.

3. The method according to claim 1 wherein the biological assay preparation comprises preparing the sample with a certain seeding density of sparse objects of interest, and wherein the at least one control parameter comprises a number or density of sparse objects of interest.

4. The method according to claim 3 wherein the sparse object of interest are explants clumps of cells, and wherein the at least one control parameter comprises a number of explants clumps of cells in the sample.

5. The method according to claim 1 wherein the at least one control parameter comprises a control parameter that relates to an intensity level or shape constraint of sparse objects of interest.

6. The method according to claim 1 wherein the at least one control parameter comprises a configurable parameter allowing at least one of refinement of an object of interest or accounting for morphological and intensity descriptors or logical combinations of these descriptors.

7. A system for imaging a sparse object of interest in a biological sample resulting from a biological assay preparation, the system comprising:
  a microscope system; and
  an image receiving device operationally connected to the microscope system, the image receiving device arranged to:
    control image acquisition and receive images from the microscope system;
    obtain an overview image of the biological sample by controlling the microscope system to acquire an image at a first magnification;
    segment the overview image based on at least one image analysis parameter identified in the overview image, the at least one image analysis parameter used by the image receiving device to define a segmentation of the overview image based on features in the overview image;
    determine a region of interest for the sparse object of interest based on the segmenting and a comparing of at least one control parameter to the at least one image analysis parameter, wherein the at least one control parameter comprises a number that relates the biological assay preparation to measured quantities of the sparse object of interest using image analysis and feature extraction to determine the region of interest, values of the at least one control parameter determined by scanning the biological sample in segmenting the overview image, and the at least one image analysis parameter accepted based on the comparison to the at least one control parameter;
    generate, based on the region of interest and the at least one control parameter, a magnification suggestion for obtaining a magnified image of the sparse object of interest; and
    drive selection and position of a lens of the microscope system according to the region of interest and the magnification suggestion, aligning a field of view of the microscope system with the region of interest and the magnification suggestion to obtain a magnified image of the sparse object of interest by controlling the microscope system, the microscope system acquiring images of the region of interest according to the field of view at a second magnification higher than the first magnification.

8. The system according to claim 7 wherein the region of interest comprises a bounding box for the sparse object of interest, and wherein driving the selection and position of the lens to obtain the magnified image comprises choosing the second magnification, from a set of available magnifications, that gives the highest possible resolution when still imaging a whole sparse object of interest as defined by the bounding box.

9. The system according to claim 7 wherein the biological assay preparation comprises preparing the sample with a certain seeding density of sparse objects of interest, and wherein the at least one control parameter comprises a number or density of sparse objects of interest.

10. The system according to claim 9 wherein the sparse objects of interest are explants clumps of cells, and wherein the at least one control parameter comprises a number of explants clumps of cells in the sample.

11. The system according to claim 7 wherein the at least one control parameter comprises a control parameter that relates to an intensity level or shape constraint of sparse objects of interest.

12. The system according to claim 7 wherein the at least one control parameter comprises a configurable parameter allowing at least one of refinement of an object of interest or accounting for morphological and intensity descriptors or logical combinations of these descriptors.

13. The system according to claim 7 wherein the image receiving device is a computer.

14. The method according to claim 1, wherein the segmenting further comprises automatically scanning through the overview image and reporting the at least one control parameter.

15. The method according to claim 1, wherein the magnification suggestion comprises a plurality of suggested magnifications, and wherein the second magnification is selected from the plurality of suggested magnifications.

16. The system according to claim 7, wherein the magnification suggestion comprises a plurality of suggested magnifications, and wherein the second magnification is selected from the plurality of suggested magnifications.

* * * * *